(12) United States Patent
Álvarez Gatica

(10) Patent No.: US 11,147,247 B2
(45) Date of Patent: Oct. 19, 2021

(54) SYSTEM FOR THE ELIMINATION OF PARASITES ADHERED TO FISH, BY DIRECTLY APPLYING ELECTRICITY TO THE FISH, REMOVING THE PARASITES WITHOUT HARMING THE FISH

(71) Applicant: Raúl Hernán Álvarez Gatica, Puerto Montt (CL)

(72) Inventor: Raúl Hernán Álvarez Gatica, Puerto Montt (CL)

(*) Notice: Subject to any disclaimer, the term of this patent is extended or adjusted under 35 U.S.C. 154(b) by 228 days.

(21) Appl. No.: 16/348,985

(22) PCT Filed: Nov. 16, 2017

(86) PCT No.: PCT/CL2017/050068
§ 371 (c)(1),
(2) Date: May 10, 2019

(87) PCT Pub. No.: WO2018/090157
PCT Pub. Date: May 24, 2018

(65) Prior Publication Data
US 2019/0269107 A1    Sep. 5, 2019

(30) Foreign Application Priority Data

Nov. 17, 2016 (CL) .................................. 2937-2016

(51) Int. Cl.
*A01K 61/13* (2017.01)
*A01K 63/00* (2017.01)
(Continued)

(52) U.S. Cl.
CPC .............. *A01K 61/13* (2017.01); *A01K 13/00* (2013.01); *A01K 61/00* (2013.01); *A01K 63/00* (2013.01);
(Continued)

(58) Field of Classification Search
CPC .... A01K 13/00; A01K 13/001; A01K 13/003; A01K 61/10; A01K 61/13
(Continued)

(56) References Cited

U.S. PATENT DOCUMENTS 4,457,221 A     7/1984  Geren
10,757,922 B2*  9/2020  Wiesman ............... A01K 61/13
(Continued)

FOREIGN PATENT DOCUMENTS

CL   2013002345      8/2014
JP   5-146233    *   6/1993
(Continued)

OTHER PUBLICATIONS

International Search Report of PCT/CL2017/050068, dated Mar. 18, 2018.

*Primary Examiner* — David J Parsley
(74) *Attorney, Agent, or Firm* — Benesch, Friedlander, Coplan & Aronoff LLP

(57) ABSTRACT

A system for the elimination of parasites adhered to fish. The system includes an entry and drainage area configured for the fish with parasites to enter the system, the entry and drainage area joined to an application area through which the fish with parasites pass and come into contact with curtain electrodes and/or grill electrodes. The system includes spray nozzles at least partially housed in the application area and a return chute at least partially situated below the application area to receive and channel the sprayed water. The system also includes a pump that pumps the water to the spray nozzles and an outlet through which the fish without parasites exit the system.

8 Claims, 3 Drawing Sheets

(51) Int. Cl.
  *A01K 61/00* (2017.01)
  *A01K 13/00* (2006.01)
  *A01M 19/00* (2006.01)
  *A22C 25/08* (2006.01)
(52) U.S. Cl.
  CPC .............. *A01M 19/00* (2013.01); *A22C 25/08* (2013.01); *Y02A 40/81* (2018.01)
(58) Field of Classification Search
  USPC ......................................... 119/650, 665, 669
  See application file for complete search history.

(56) References Cited

U.S. PATENT DOCUMENTS

| | | |
|---|---|---|
| 2013/0050465 A1 | 2/2013 | Beck |
| 2014/0174371 A1* | 6/2014 | Ulriksen ................ A01K 63/00 119/219 |
| 2017/0172114 A1* | 6/2017 | Halse ........................ B08B 3/02 |
| 2018/0153142 A1* | 6/2018 | Hansen .................. A01K 61/13 |

FOREIGN PATENT DOCUMENTS

| | | | |
|---|---|---|---|
| JP | 06153744 A | 6/1994 |
| WO | 9417657 A1 | 8/1994 |
| WO | 9824304 A1 | 11/1998 |
| WO | 2014184766 A1 | 11/2014 |

* cited by examiner

SYSTEM FOR THE ELIMINATION OF PARASITES ADHERED TO FISH, BY DIRECTLY APPLYING ELECTRICITY TO THE FISH, REMOVING THE PARASITES WITHOUT HARMING THE FISH

RELATED APPLICATIONS

This application is the national stage of International Patent No. PCT/CL2017/050068, filed on Nov. 16, 2017, which is incorporated herein by reference.

BACKGROUND

Saltwater fish farmers have been challenged by multiple diseases, among which we refer to parasitic diseases, we will refer to parasites, the attack of ectoparasites like the sea louse (of the *Caligus Rogercresseyi* and *Lepeophtheirus Salmonis* species) that are present in the environment and attack fish in farms.

The parasitic infection with sea lice (of the *Caligus* and *Lepeophtheirus* species) is a serious issue for the fish farming industry, mainly for Salmon and Trout farmers. The ectoparasites located on the fish skin eat the mucosa, skin and blood, and damage the fish surface and tissue, causing economic losses due to: growth rate reduction, death, increase in infection and disease predisposition, poor quality of harvested product, and increase in production costs due to the infection treatment cost.

Caligidosis infection is a health threat for Salmon and Trout farming not only in Chile, but also in countries of the northern hemisphere like Canada, Norway and others.

Currently, multiple treatments are used to fight against the sea louse issue among which we find the following: vaccines, chemicals added to feed, chemicals applied in baths, among other treatment methods for parasitic diseases.

Chemical application in baths is the method most frequently used in the fight against sea louse. Chemicals used for baths treatments of fish attacked by the sea louse have a very high economic cost and an unknown environmental impact.

In the state of the art, multiple alternatives are disseminated to face the parasite issue in farmed fish, the closer being the following:

Application WO 97127744, of Ferranti-Thomsori Sonar Systems U.K. Limited published on Aug. 7, 1997, which describes a method and a device to reduce the parasitic infection of or damage to aquatic creatures including: elements to generate transient cavitation events in the environment surrounding the creatures, to produce biological changes that affect their development cycle and the lifespan of the parasites. In the case of fish treatment, it describes a device that comprises a transducer matrix located around a circle that emits cavitation events that damage and/or kill the parasites without harming the fish. The frequency generated by the transducers ranges between 1 kHz and 100 kHz, the proper frequency to generate cavitation events being one ranging between 20 kHz and 40 kHz (the frequency above 20 kHz is within the ultrasound frequency).

Application 201302345, of Grupo Marco SPA, published on Aug. 22, 2014, describes a Method to separate the parasites that adhere to fish skin that requires the generation of electric currents through an electronic device, the installation of an array of reflectors spaced inside a dielectric device (area known as sweeper) and the generation of electromagnetic pulses. The electronic device generates pulsating electrical currents towards the reflectors, which propagate them inside the dielectric device generating electromagnetic pulses. According to this application, fish with water get inside the dielectric device, where they are exposed to the electromagnetic pulse fields, which causes the parasites to fall off their host. For its application, this method requires the dielectric device to be always full of water.

Application WO 2012/148283, published on Nov. 1, 2012, and application CL 2014003044, published on May 31, 2013 of OCEA AS, which describes: a system for the treatment of lice for sea organisms like fish, which comprises an entry channel with a separator for the entrance of fish without water, a pipe for fish transportation, in which, at least, a part of such pipe constitutes a liquid bath for the fish, a second separator to separate fish from such treatment liquid, an outlet for the release of treated fish which is located after the second separator, and a circulation pump for the treatment liquid circulation in the closed system. The part of the pipe that comprises the liquid bath has a "U" shape in such a way that a liquid bath is formed with the respective liquid surfaces. The treatment liquid could be warm water with a temperature of approximately 30° C. and alternatively, or besides, the treatment liquid could be water with chemical products added. Fish go through the pipe to the thermal or chemical bath and the parasites fall off the fish.

Application 201403044 of Salmones Multiexport S.A. published on Feb. 13, 2015 that describes: a closed multipurpose system to remove sea lice from fish in situ, which is installed on the surface of a ship, naval device or floating platform that comprises: an entry drainage chute, a main container, which has a cylinder installed inside, and a helical conveyor, heater elements, temperature control elements, an outlet vessel, a second container and filters to recover the lice located inside the cylinder. Fish enter into the cylinder, which has the helical conveyor inside the main container that is the liquid bath pond where fish treatment for sea lice removal through fish contact with the treatment liquid (water) at a temperature between 28 and 38° C. takes place.

Application WO 2015/143549 of Cooke Aquaculture INC., published on Oct. 10, 2015, which describes Method and device to remove sea louse from living fish that comprises a hot water source, a slide for the fish to slide downwards, a plurality of warm water shower nozzles. Fish enter into the slide pipe where they are exposed to warm water showers from the entry to the outlet, which create a heated water flow where fish slide and which make parasites fall from fish. Water temperature ranges between 30 and 40° C.

The methods, systems and devices currently used for the removal of parasites adhered to fish require major maneuvers (chemical baths in situ), are costly, with harmful effects to the environment, cause a high stress level and a significant post-application mortality.

This invention has as main objective to provide a novel alternative, environmentally friendly and efficient for the removal of parasites adhered to fish in sea fish farms.

Compared to the above-mentioned methods, it has the following advantages:

It is environmentally friendly: it does not discharge harmful substances to the water environment.

All parasites are captured and removed: there is no chance for them to return to the environment.

It does not generate resistance in the parasites: it is impossible to generate tolerance or antibodies due to treatment with this device.

It minimizes stress: when applied, the device exposes fish to a regulated voltage and current leading to parasite removal without causing stress or damage to the fish.

It can be used on a ship in the case of individual farming units (round cages) or on the central walkway in the case of modular farming units (cage modules) which, for this case, produces significant savings since no ship is required.

DETAILED DESCRIPTION OF THE INVENTION

Figure 1:
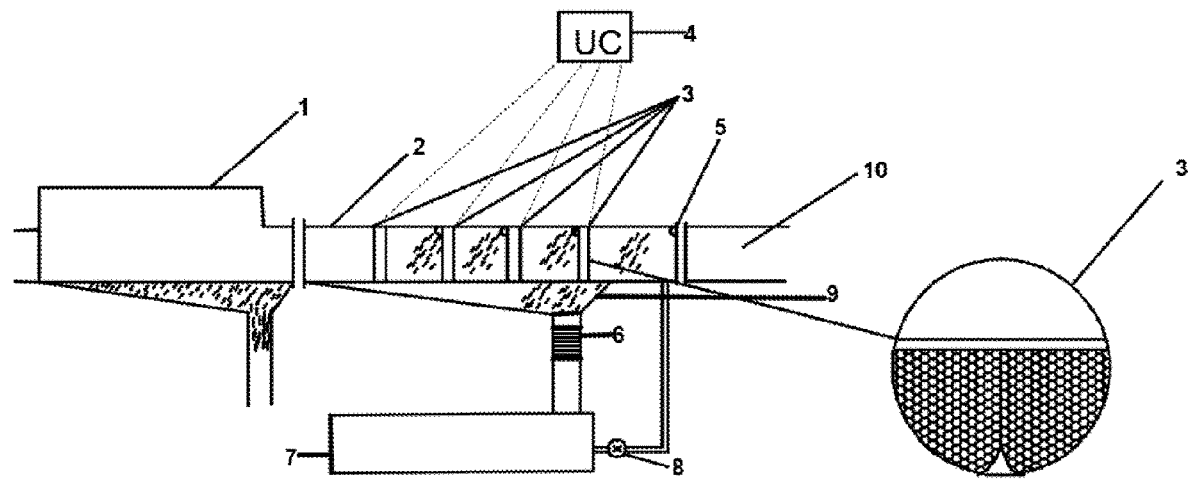
FIG. 1: represents a side view of the drawing of a components general setting of the parasite removal device with a curtain-type electrode setting.
Figure 2:
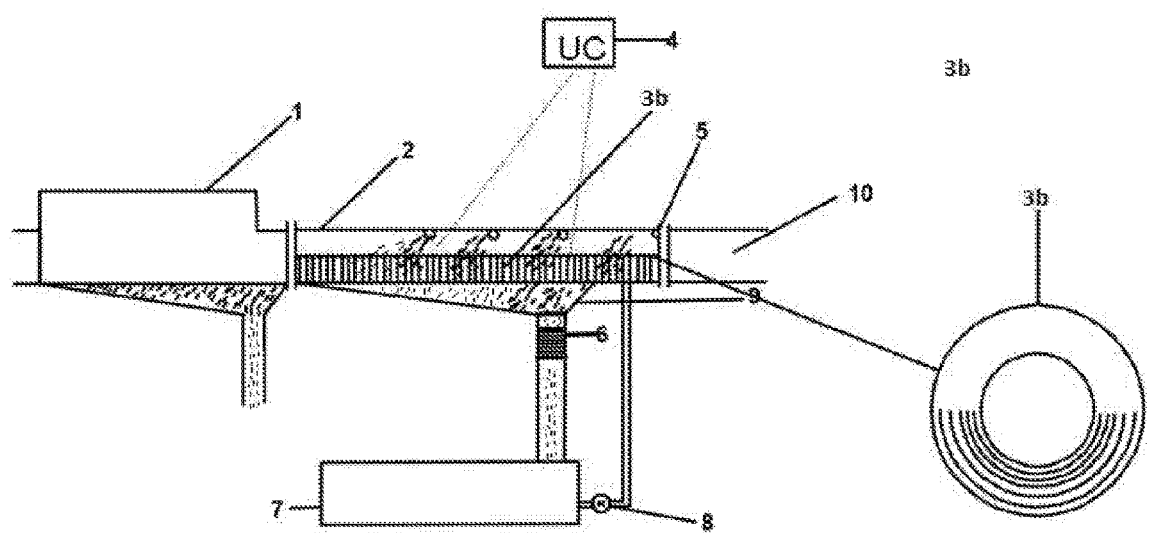
FIG. 2: represents a side view of the drawing of a components general setting of the parasite removal device with a grill electrode setting.
Figure 3:
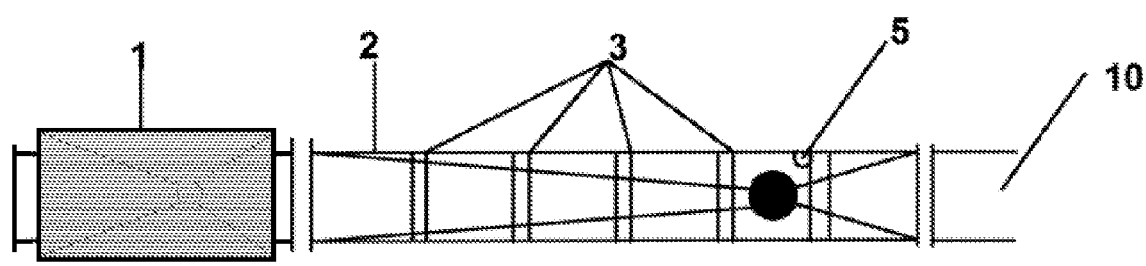
FIG. 3: represents an aerial view of the drawing of the simple setting components of the parasite removal system that includes an entry chute (1), an application area (2) and an outlet (10).
Figure 4:
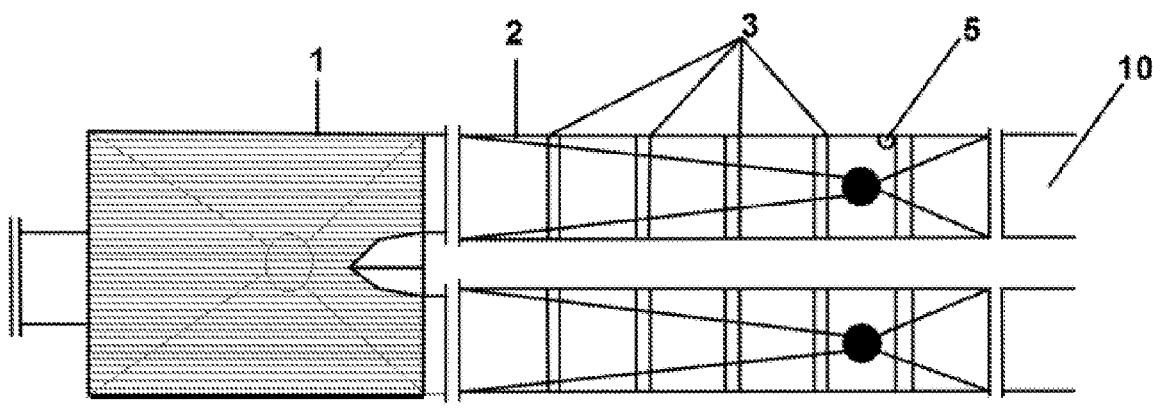
FIG. 4: represents an aerial view of the drawing of the components of a setting with a double application that includes an entry chute (1) and two of them to an application area (2) that converge into an outlet (10).
Figure 5:
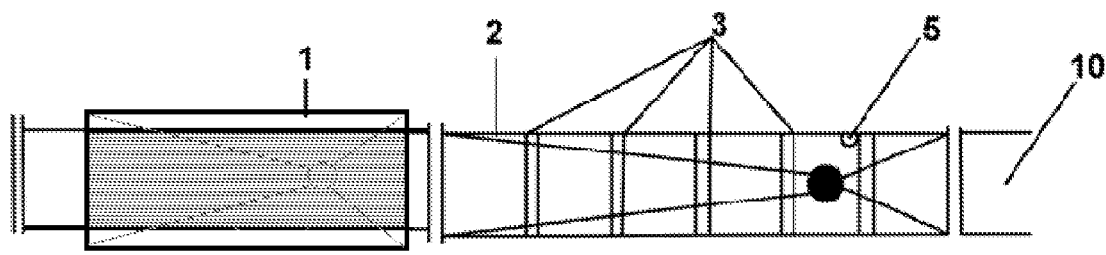
FIG. 5: represents an aerial view of the drawing of the simple setting components of the parasite removal system that includes a tubular drainage on the entry chute (1), an application area (2) and an outlet (10).
Figure 6:
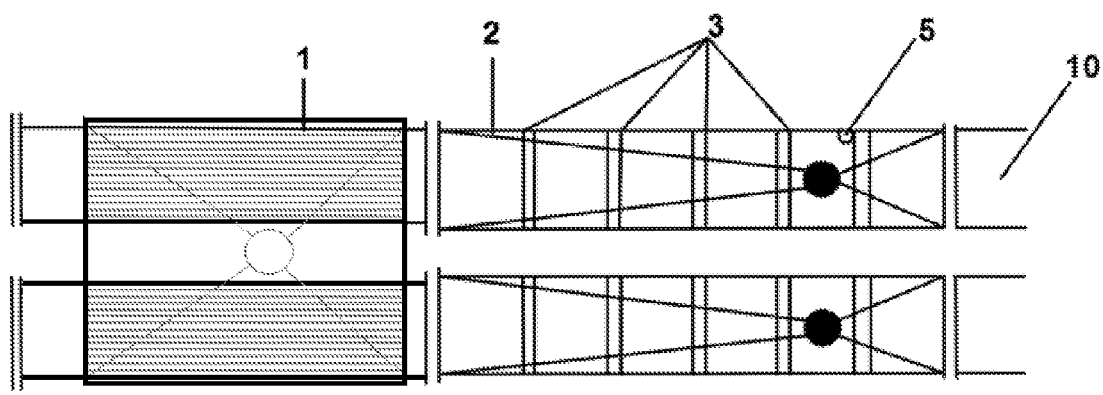
FIG. 6: represents an aerial view of the drawing of the components of a setting with a double system that includes: two entries with independent tubular drainages on the entry chute (1) with independent tubular drainages, and two of them to an application area (2) and two individual outlets (10) for the treatment of two simultaneous farming units.

This invention has as main objective to provide a novel alternative, environmentally friendly and efficient for the removal of parasites adhered to fish in sea fish farms.

This invention describes a system for the elimination of parasites adhered to fish, by directly applying electricity to the fish, thereby removing parasites without harming the fish, mounted on a stainless steel structure with wheels for works on modular centers to facilitate movement or with legs in order to be fixed on a ship or floating structure, comprising: an entry and drainage area (1) that allows the fish to be separated from the water transporting them, which is joined to an application area (2) where the fish pass through and get in contact with electrodes (3) or (3b) curtain electrodes (3) and/or grill electrodes (3b), and electricity is applied to the fish, controlled by a control unit (4) that regulates and sets the current, voltage and electrical frequency required to be applied in order to remove the parasites without damaging the fish; spray nozzles (5) installed in the application area, which spray water on the fish to make the parasites fall off and move through a return chute (9) that is installed below the application area (2) to receive and channel the sprayed water and parasites contained therein, which has a capturing filter (6) installed in a drainage pipe of the return chute (9), which traps the parasites, allowing only water to pass to a pond (7) that stores the water for spraying in the application area (2) and recovers the water by means of the return chute (9); a pump (8) that pumps the water to the spray nozzles to spray the fish in the application area (2); an outlet (10), a tube or pipe joined to the application area, through which the fish return to their environment, without parasites. The electrodes may be curtain electrodes or grill electrodes or mixed electrodes; grill electrodes may be perpendicular or diagonal to the fish flow direction.

Variables for its application:

Example of Application 1

Simple system that includes an entry and drainage area (1), an application area (2) and an outlet (10), to be used for normal cage-to-cage treatments, recommended for centers with few farming units or for treatments in round farming units, installed on a ship or floating structure.

Example of Application 2

System with double application areas that includes: an entry and drainage area (1), two application areas (2) and an outlet (10) to minimize work time, recommended for places where time is an important factor, whether due to the number of fish per farming unit or the extreme environmental conditions.

Example of Application 3

Double system that includes an entry and drainage area (1) with two entries with individual tubular drainage, two application areas (2) and two independent outlets (10) that allow performing simultaneous treatments to two farming units, recommended for centers with modular farming units for the treatment of two units at the same time, saving application time.

The way to operate this invention for parasite removal is the following:

Fish enter into the entry and drainage area (1) where the water transporting them is eliminated to enter into the application area (2) where fish get in contact with the electrodes (3 or 3b) that apply low voltage and current discharges, regulated by the control unit (4). As a result of the discharge, the parasites fall off the host and due to the spray nozzle jets applied in the application area (2) the parasites fall through the return chute (9) and are retained by the capturing filter (6). Then, fish go through the application area where the fish without parasites are returned to their environment through the outlet pipe (10).

After fish parasite removal, filters are removed and the captured parasites are eliminated. Depending on the parasite condition, it is recommended to empty the filter every time the parasite removal of a farming unit (cage) is completed

The invention claimed is:

1. A system for the elimination of parasites adhered to fish, the system comprising:
   an entry and drainage area configured for the fish with parasites to enter the system, the entry and drainage area joined to an application area through which the fish with parasites pass and come into contact with curtain electrodes and/or grill electrodes, the curtain electrodes and/or grill electrodes: (a) arranged in the application area (b) configured to apply electricity to the fish with parasites; and (c) controlled by a control unit, the control unit configured to regulate a current, a voltage, and an electrical frequency to be applied to the fish with parasites to cause parasite removal;
   spray nozzles at least partially housed in the application area, the spray nozzles configured to spray water or water with hydrogen peroxide on the fish with parasites to make the parasites fall off;

a return chute at least partially situated below the application area to receive and channel the sprayed water or water with hydrogen peroxide and parasites contained therein, the return chute including a drainage pipe at least partially housing a capturing filter; the capturing filter configured to trap the parasites, thereby allowing only water or water with hydrogen peroxide to pass to a reservoir that stores the water or water with hydrogen peroxide for spraying in the application area;

a pump that pumps the water or water with hydrogen peroxide to the spray nozzles; and an outlet through which the fish without parasites exit the system.

2. The system of claim 1, wherein the electrodes comprise curtain electrodes.

3. The system of claim 1, wherein at least one of the grill electrodes is oriented substantially perpendicularly to a fish flow direction.

4. The system of claim 1, wherein the system is mounted on a stainless steel profile structure with wheels, such that the system is mobile.

5. The system of claim 1, wherein the system includes legs to be installed on a ship or floating platform.

6. The system of claim 1, wherein the electrodes comprise grill electrodes.

7. The system of claim 1, wherein the electrodes comprise curtain and grill electrodes.

8. The system of claim 3, wherein at least one of the grill electrodes is oriented diagonally to a fish flow direction.

\* \* \* \* \*